(12) United States Patent
Schellhorn et al.

(10) Patent No.: US 11,192,553 B2
(45) Date of Patent: Dec. 7, 2021

(54) METHOD FOR AUTONOMOUS CARS TO CHANGE LANES ON MOTORWAYS

(71) Applicants: Henry Schellhorn, Los Angeles, CA (US); Yuan Cheng, Los Angeles, CA (US)

(72) Inventors: Henry Schellhorn, Los Angeles, CA (US); Yuan Cheng, Los Angeles, CA (US)

(\*) Notice: Subject to any disclaimer, the term of this patent is extended or adjusted under 35 U.S.C. 154(b) by 306 days.

(21) Appl. No.: 16/383,601

(22) Filed: Apr. 13, 2019

(65) Prior Publication Data
US 2020/0324775 A1    Oct. 15, 2020

(51) Int. Cl.
| | |
|---|---|
| *B60W 30/18* | (2012.01) |
| *G08G 1/16* | (2006.01) |
| *G08G 1/01* | (2006.01) |
| *G05D 1/00* | (2006.01) |

(52) U.S. Cl.
CPC ..... *B60W 30/18163* (2013.01); *G05D 1/0088* (2013.01); *G08G 1/0129* (2013.01); *G08G 1/0145* (2013.01); *G08G 1/167* (2013.01); *G05D 2201/0213* (2013.01)

(58) Field of Classification Search
CPC .......... B60W 30/18163; G05D 1/0088; G05D 2201/0213; G08G 1/0129; G08G 1/0145; G08G 1/167
See application file for complete search history.

(56) References Cited

U.S. PATENT DOCUMENTS

| | | | |
|---|---|---|---|
| 10,037,689 B2 * | 7/2018 | Taylor | ................ G06K 7/10475 |
| 2018/0059670 A1 * | 3/2018 | Nilsson | ............... B60W 30/095 |
| 2018/0061253 A1 * | 3/2018 | Hyun | ..................... G08G 1/166 |
| 2019/0228593 A1 * | 7/2019 | Liu | ....................... G08G 1/0116 |

FOREIGN PATENT DOCUMENTS

| | | | | |
|---|---|---|---|---|
| CN | 105047057 A | * | 11/2015 | |
| CN | 107161155 A | * | 9/2017 | |
| CN | 109035862 A | * | 12/2018 | |
| DE | 10055874 A1 | * | 5/2002 | .......... G07B 15/063 |
| DE | 102014000843 A1 | * | 8/2014 | ...... B60W 30/18163 |
| WO | WO-2018072240 A1 | * | 4/2018 | ............... G08G 1/08 |

\* cited by examiner

*Primary Examiner* — Frederick M Brushaber
*Assistant Examiner* — Elizabeth Yang
(74) *Attorney, Agent, or Firm* — Che-Yang Chen; Law Office of Michael Chen

(57) ABSTRACT

A method for autonomous vehicles to change lanes on a motorway may include steps of providing a computer system enabling an incoming vehicle that conducts lane change to negotiate with an incumbent vehicle that stays in its lane; generating first synchronous data on traffic density and traffic speed to the vehicles in both the transversal and longitudinal directions on the motorway; generating second synchronous data on traffic density and traffic speed to said vehicles for vehicles entering on the motorway and exiting the motorway; providing a summary of historical statistics on the first and second synchronous data to the vehicles; calculating a fair price of each lane of the motorway at a predetermined location, at a predetermined time and within a predetermined tolerance; and generating a protocol to change lanes, wherein said incoming vehicle pays said incumbent vehicle the fair price to move in front of the incumbent vehicle.

4 Claims, 9 Drawing Sheets

10  Initialize $\rho_i^{-I_{min},j}, u_i^{-I_{min},j}$  ($l = 0, ..., L; j = 0, ..., J$)

15  Initialize TimeSaved, MoneyPaid

20  Initialize $p_i^{-I_{min},j} = \rho_i^{-I_{min},j}; \bar{p}_i^j = \rho_i^{-I_{min},j}$  ($l = 0, ..., L; j = 0, ..., J$)

30  Generate Noise ($i = -I_{min}, ..., I_{max}, l = 0, ..., L; j = 0, ..., J$)

$$U_i^{i,j} = \sigma_i^\gamma \sum_{i'=-I_{min}}^{i} \sum_{j'=0}^{j} f_{i,i'}^{j,j'} z_i^{i,j} \sqrt{\Delta t}\sqrt{\Delta x}$$

$$U_{1,i}^{i,j} = \sigma_i^\gamma \sum_{j'=0}^{j} f_{i,i'}^{j,j'} z_i^{i,j} \sqrt{\Delta t}$$

$$U_i^{i,j} = \sigma_i^\gamma \sum_{i'=-I_{min}}^{i} \square \sum_{j'=0}^{j} \frac{\partial f_{i,i'}^{j,j'}}{\partial t} z_i^{i,j} \sqrt{\Delta t}\sqrt{\Delta x}$$

50  For $i = -I_{min}$ to $I_{max} - 1$

60  For $j = 0$ to $J_{max} - 2$, $l = 0$ to $L$

70  If $l = 0$ then $q_{y,0}^{i,j}$ = incoming/outgoing traffic flow

80  Else $q_{y,l}^{i,j} = (-K_0(\rho_l^{i,j} - \rho_{l-1}^{i,j}) + K_1 \frac{\sqrt{\rho_{l+1}^{i,j} \rho_l^{i,j}}}{\rho_{max}}(p_{l+1}^{i,j} - p_l^{i,j}))/\Delta y$ 90  $q_{x,l}^{i,j} = u_l^{i,j} \rho_l^{i,j}; \rho_l^{i+\frac{1}{2},j} = \rho_l^{i,j} + \frac{\Delta t}{\Delta y}(q_{y,l}^{i,j} - q_{y,l+1}^{i,j})$ 110  $F_{i,j}^L = \min(\bar{F}, F(\min(\rho_l^{i+\frac{1}{2},j}, \frac{\rho_{max} g(U_l^{i,j})}{2}), g(U_l^{i,j})),$ $F(\max(\rho_l^{i+\frac{1}{2},j+1}, \frac{\rho_{max} g(U_l^{i,j+1})}{2}), g(U_l^{i,j+1})))$ 120  $F_{i,j}^R = \min(\bar{F}, F(\min(\rho_l^{i+\frac{1}{2},j+1}, \frac{\rho_{max} g(U_l^{i,j+1})}{2}), g(U_l^{i,j+1})),$ $F(\max(\rho_l^{i+\frac{1}{2},j+2}, \frac{\rho_{max} g(U_l^{i,j+2})}{2}), g(U_l^{i,j+2})))$ 150  $\rho_l^{i+1,j} = \rho_l^{i+\frac{1}{2},j} + \frac{\Delta t}{\Delta x}(F_{i,j}^L - F_{i,j}^R)$

FIG. 5

160 $\quad u_l^{i+1,j} = u_{max}(1 - \frac{\rho_l^{i+1,j}}{\rho_{max}})g(U_l^{i,j})$ 165 $\quad A = \frac{1}{2}g''(U_l^{i,j})(U_{l,1}^{i,j})^2 + g'(U_l^{i,j})U_{l,2}^{i,j}$ 170 $\quad \mu_{u,l}^{i,j} = \frac{u_{max}}{\rho_{max}g(U_l^{i,j})}(g^2(U_l^{i,j}))\left(\frac{q_{x,l}^{i,j} - q_{x,l}^{i,j-1}}{\Delta x} + \frac{q_{y,l}^{i,j} - q_{y,l-1}^{i,j}}{\Delta y}\right) + \frac{\rho_{max}}{u_{max}}u_l^{i,j}A$ 180 $\quad \tilde{\mu}_{u,l}^{i,j} = \mu_{u,l}^{i,j} + \frac{1}{\Delta x}(u_l^{i,j} - u_l^{i-1,j})u_l^{i,j}; \quad b_l^{i,j,j'} = g'(U_l^{i,j})u_l^{i,j}f_{i,l}^{j,j'}/g(U_l^{i,j})$ 200 $\quad \vec{\tilde{\mu}}_{u,l}^i = [\tilde{\mu}_{u,l}^{i,0}, \ldots, \tilde{\mu}_{u,l}^{i,J}]$ 210 $\quad B_{u,l,i,j} = \begin{bmatrix} b_{u,l}^{i,0,0} & \cdots & b_{u,l}^{i,0,J} \\ \vdots & \ddots & \vdots \\ b_{u,l}^{i,J,0} & \cdots & b_{u,l}^{i,J,J} \end{bmatrix}$ 220 $\quad \tilde{\lambda}_{u,l}^{i,j} = \frac{B_{u,l,i}^{-1}\mu_{u,l}^i}{\sigma_y(l)}; \quad \lambda_{u,l}^{i,j} = sgn(\tilde{\lambda}_{u,l}^{i,j})\max(|\tilde{\lambda}_{u,l}^{i,j}|, \varepsilon);$ 230 $\quad \mu_{p,l}^{i,j} = -\kappa(p_l^{i,j} - \bar{p}_l^j)$ 240 $\quad \tilde{\mu}_{p,l}^{i,j} = \mu_{p,l}^{i,j} + \frac{p_l^{i,j} - \bar{p}_l^j}{\Delta x}u_l^{i,j}$ 250 $\quad \sigma_{p,l}^{i,j} = \frac{\mu_{p,l}^{i,j}}{\lambda_{u,l}^{i,j}}$ 260 $\quad p_l^{i+1,j} = p_l^{i,j} + \mu_{p,l}^{i,j}\Delta t + \sigma_{p,l}^{i,j}Z_l^{i,j}\sqrt{\Delta t}$

FIG. 5 (Cont'd)

270 Define *function* TravelTime($x_{dest}, u_i^{i,j}, i, j, l$):
    $tt = 0, t = i\Delta t, x = j\Delta x$
    while $x_{dest} > x$:
        if $x_{dest} - x \geq \frac{u_l^{i,j} + u_l^{i,j+1}}{2}$:
            $tt = tt + \Delta t$
            $x = x + \frac{u_l^{i,j} + u_l^{i,j+1}}{2} \Delta t$
            $i = i + 1, j = floor(x/\Delta x)$
        else:
            $tt = tt + \frac{x - x\_dest}{(u_l^{i,j} + u_l^{i,j+1})/2}$
            $x = x\_dest$
    Return $tt$ 280 For $i = -I_{min}$ to $I_{max} - 1$ 290     For $j = 0$ to $J_{max} - 2$, $l = 0$ to $L$ 300         $TimeSaved = K_1 \frac{\sqrt{\rho_{l+1}^{i,j} \rho_l^{i,j}}}{\rho_{max}} (\rho_{l+1}^{i,j} - \rho_l^{i,j})) \Delta x / \Delta y (TravelTime(x_{dest}, u_l^{i,j})$
                  $- TravelTime(x_{dest}, u_{l-1}^{i,j}))$ $MoneyPaid = K_1 \frac{\sqrt{\rho_{l+1}^{i,j} \rho_l^{i,j}}}{\rho_{max}} (\rho_{l+1}^{i,j} - \rho_l^{i,j})) \Delta x / \Delta y (\rho_{l+1}^{i,j} - \rho_l^{i,j})$

FIG. 5 (Cont'd)

| Distance | 0 | 0.5 | 1 | 1.5 | 2 | 2.5 | 3 | 3.5 | 4 | 4.5 |
|---|---|---|---|---|---|---|---|---|---|---|
| Lane 1 | 100.0 | 102.4 | 104.2 | 105.0 | 104.5 | 103.0 | 100.7 | 98.2 | 96.2 | 95.1 |
| Lane 2 | 80.0 | 82.4 | 84.2 | 85.0 | 84.5 | 83.0 | 80.7 | 78.2 | 76.2 | 75.1 |
| Lane 3 | 60.0 | 62.4 | 64.2 | 65.0 | 64.5 | 63.0 | 60.7 | 58.2 | 56.2 | 55.1 |
| Lane 4 | 40.0 | 42.4 | 44.2 | 45.0 | 44.5 | 43.0 | 40.7 | 38.2 | 36.2 | 35.1 |

| Distance | 5 | 5.5 | 6 | 6.5 | 7 | 7.5 | 8 | 8.5 | 9 | 9.5 |
|---|---|---|---|---|---|---|---|---|---|---|
| Lane 1 | 95.2 | 96.5 | 98.6 | 101.1 | 103.3 | 104.7 | 104.9 | 104.0 | 102.1 | 99.6 |
| Lane 2 | 75.2 | 76.5 | 78.6 | 81.1 | 83.3 | 84.7 | 84.9 | 84.0 | 82.1 | 79.6 |
| Lane 3 | 55.2 | 56.5 | 58.6 | 61.1 | 63.3 | 64.7 | 64.9 | 64.0 | 62.1 | 59.6 |
| Lane 4 | 35.2 | 36.5 | 38.6 | 41.1 | 43.3 | 44.7 | 44.9 | 44.0 | 42.1 | 39.6 |

FIG. 6

METHOD FOR AUTONOMOUS CARS TO CHANGE LANES ON MOTORWAYS

FIELD OF THE INVENTION

This invention relates to methods for driving autonomous, or self-driving vehicles on a motorway. More specifically, the invention relates to how to implement an entirely automatic lane change on the motorway involving autonomous vehicles.

BACKGROUND OF THE INVENTION

An autonomous vehicle, also known as a robot car, self-driving, or driverless car, is a vehicle that is capable of sensing its environment and moving with little or no human input.

In general, autonomous cars combine a variety of sensors to perceive their surroundings, such as radar, Lidar, sonar, GPS, odometry and inertial measurement units. Advanced control systems are configured to interpret sensory information to identify appropriate navigation paths, as well as obstacles and relevant signage.

Potential benefits for autonomous vehicles may include reducing costs, increasing safety, mobility and customer satisfaction, and lowering the chance of crime. Safety benefits include a reduction in traffic collisions that result in injuries and related costs, including medical payments and insurance premium. Automated cars are predicted to increase traffic flow; provide enhanced mobility for children, the elderly, disabled, and the poor; relieve travelers from driving and navigation chores; increase fuel efficiency of vehicle; significantly reduce needs for parking space; reduce crime; and facilitate business models for transportation as a service, especially via the sharing economy.

However, problems for autonomous vehicles may include safety, possible technological errors, liability, legal framework and government regulations, risk of loss of privacy and security concerns, such as hackers or cyber terrorism, concern about the loss of driving-related jobs in the road transport industry, and risk of increased suburbanization as travel becomes more convenient.

The second DARPA Grand Challenge in 2005 concluded significant advances in the technology of autonomous cars. Several car manufacturers, including Tesla, Audi, and Waymo are currently testing autonomous cars on US roads, including motorways. In October 2018, Waymo announced that its test vehicles had traveled in automated mode for over 16,000,000 km.

An interesting feature of autonomous vehicles is their possibility to be assembled into platoons or convoys. The US department of transportation sponsored such a project in 1997 on Interstate 15. Potential benefits include faster throughput, possibility to relieve several human drivers of their duties, as well as increased fuel efficiency, due to lower aerodynamic drag. In Europe, the SARTRE project organizes the assembly of trucks into platoons.

A classification system based on six different levels (ranging from fully manual to fully automated systems) was published in 2014 by SAE International. In level 4, self-driving is supported only in limited spatial areas (geofenced) or under special circumstances, like traffic jams. In level 5, no passenger input is required.

Our invention would be most useful for vehicles equipped with either level 4 or level 5 equipment. This type of equipment enables them to drive autonomously on a motorway, but not necessarily in city street traffic. Vehicles with that equipment must also be able to communicate with each other in real-time. Examples include collision avoidance and sharing news about traffic. Our invention requires another layer of communication between autonomous vehicles, to enable two vehicles driving on adjacent lanes on a motorway to coordinate the following maneuver: the lane change, whereby an incoming vehicle needs to move to the adjacent lane, which is currently occupied by another vehicle (referred to as the incumbent vehicle), requiring the incumbent vehicle to slow down when traffic is heavy.

Moreover, the invention suggests a trading mechanism. The incoming vehicle needs to pay a small price to the incumbent car. One of the most important points of the invention is to determine a fair price at which the two vehicles may decide to transact. American drivers are willing to pay for the speed. According to Litman (2009) and Fieldsing (1993), Americans are ready to pay an average of $12.5 per hour of travel time saved in local travel, while this amount goes up to $18 per hour in intercity travel. In 2016, 3.22 trillion miles were driven in the US, and 84 billion hours were spent in driving. These figures suggest that Americans would be ready to spend $15 billion a year to reduce their driving time by 1%, if it were possible to do so.

Different systems exist that allow vehicles to pay for a greater speed. Toll roads are a prime example. To bypass the heavy cost and environmental impact of constructing new motorways, some traffic agencies, like Caltrans in California, allow single-occupancy vehicles (SOV) equipped with a special transponder to drive on carpool lanes, where the traffic usually is light. An automated system enables the SOV to pay the motorway operator (Caltrans) for usage of the carpool lane. We refer to this system of using carpool lanes for fast lane as a fixed fast lane system, since the fast lanes are fixed in advance. Anecdotal evidence shows that Caltrans charges between $1 and $2 for 10 miles on one of their fixed fast lanes, on the 10 Interstate Freeway in Los Angeles, depending on traffic conditions.

Critical to the implementation of our invention are numerical methods that can forecast traffic as well as calculate prices. Most traffic models are physical-queue models (see Garavello et al. (2016) p. 4), i.e., models where the quantity of vehicles is conserved. The traffic literature describes two types of models: macroscopic models and microscopic models. A macroscopic model considers aggregate quantities, such as car density, usually in a Eulerian coordinate system, i.e., where the quantities are measured at a fixed point. A microscopic model considers the position of individual cars. This is referred to as a Lagrangian coordinate system. Moving from Eulerian to Lagrangian coordinate is difficult, especially as some features of traffic such as accidents or incoming traffic are random. An essential ingredient in the change of referential is the Ito-Wentzell formula developed by Wentzell (1965). While every physical-queue model must implement the conservation law, the relation between speed and density depends on the type of model chosen. Before moving to models of a road with more than one lane, we describe models with only one lane. The first such model is the LWR model developed by Lighthill and Whitham (1955) as well as Richards, where speed is a linear decreasing function of density. More sophisticated models exist, such as the Aw-Raschle-Zhang (2000) model, which allows to capture accelerations after traffic jams. While for definiteness, we implement hereafter the LWR model, we emphasize that our invention is not limited to any particular model. As stated in the literature (see Garavello et al (2016)), a traffic model must be such that:

the quantity of cars is conserved
car speed remains positive and limited upward
car density is positive
due to the presence of accidents, speed is potentially stochastic
traffic inflow and outflow are modelled.

Among other features, our invention satisfies these requirements to compute the fair price. Mathematicians classify these traffic models as hyperbolic models. They do not admit analytical solutions. The first method to solve numerically such a model was given by Godunov (1959). When adding noise, these models are particularly difficult to solve. We use the variant of the Godunov method provided by Adrieannov et al (2012), which solves problems with spatially-varying flux. As far as we know, we are the first ones to implement this method to stochastic traffic flows. Other stochastic models of traffic include Jabari and Liu (2012), Holden and Risebro (1997), and Feng and Nualart (2008).

Traffic models for roads with more than one lane in each direction have not been studied extensively. Herty and Klar (2003) presented a model on a multi-lane freeway where agents compete for limited roadway capacity to reach a Nash equilibrium. Our equilibrium concept is inspired from the no-arbitrage theory that is used in financial economics to price financial options. It is a generalization to the stochastic case of the Wardropian equilibrium of traffic theory (Wardrop et al (1952)), which states that in equilibrium every path with the same origin and destination should take the same time in traffic.

As in every field of science, model-based approaches need to be contrasted with statistical approaches. In a statistical approach one would look for prices of a transaction that resemble the transaction the incoming car is in and infer its price based on an averaging procedure. We point out that, for the problem of changing lane, the statistical approach suffers from three shortcomings. First, data will be missing, in particular before the system is implemented. Second, the users of the system will not understand the decision of a statistical system. Third, in case of low liquidity, a pure statistical system can easily be cornered by a group of vehicles that produce fake transactions between themselves. While it is certainly possible to mix real data with model data to produce an efficient forecast of the fair price, such an approach will not be discussed in the present invention.

SUMMARY OF THE INVENTION

The invention may include two parts: a protocol, specifying the mechanics of the transaction between an incoming and an incumbent vehicle or group of vehicles, and a pricing method, which calculates, at each point in time, and location of the freeway, the fair price to move into the current lane, from either the right or the left.

The incoming vehicle may desire to move to the adjacent lane, whether the lane to the right or to the left, for reasons independent of this invention: (i) the incoming vehicle may need to exit the motorway, and thus move to the right lane (ii) an accident occurred just in front of the incoming vehicle and thus blocks the lane, or (iii) the navigation system of the incoming vehicle decides it is more advantageous to move to the adjacent lane, either because it is faster or because it is adjacent to other lanes that are or will be faster down the road, or (iv) the current lane, albeit not necessary slower than the others exhibits too much speed variation (stop and go) (v) passengers in each car have different preferences for time versus money. These factors rule out a simple solution whereby lane price should be proportional to density.

The protocol as shown in FIG. 1 is for the incoming car to check whether there is enough space in the adjacent lane to move. If not, the incoming car contacts the incumbent vehicle, i.e., the vehicle occupying enough space on the adjacent lane to prevent the incoming car from moving and starts negotiating. A critical component of the negotiation is that both vehicles are able to calculate a fair price for the lane, which enables the negotiation to occur in real-time. As a result of the negotiation, either the incumbent car accepts to slow down and let the incumbent move in front of it in exchange of the price of the lane change, or it does not. In this case, the incoming car will negotiate with vehicles that are located on the same lane as the incumbent vehicle, but just behind it.

There is no need for the traffic authority to be involved in this protocol. It could be implemented by any company that secures the clearing of the transaction. Clearing the transaction may include two procedures. First, verifying that the incoming vehicle has enough money in its account with the clearing company to pay for the price of the lane change. Second, verifying that the incumbent vehicle slows down sufficiently to let the incoming car in. A mechanism to ensure that no other vehicle takes advantage of the incremental space left by the incumbent car at the disposal of the incoming car may not be covered in the present invention. We consider this as the cost of doing business. We emphasize that the trading part of the transaction is much more difficult to implement correctly than the clearing part.

In a second aspect of the invention, the traffic authority can be included as a party to the transaction. There are indeed several advantages for the traffic authority to be part of this mechanism: in case of traffic/price instability, the authority could for instance shut down the system. Another less obvious advantage is to refrain vehicles from gaming the system as we shall see in the next section.

Our pricing method enables us to calculate a fair price at which the incumbent vehicle and the incoming vehicle should transact. The method is based on a no-arbitrage theory. An arbitrage may include two paths with the same origin and destination for which one path (the "good" path) is systematically better (across all random scenarios) in terms of both speed and money disbursed to change lanes. There is no arbitrage if, for at least one scenario, the good path is inferior in either speed of money disbursed. It is known that a sufficient condition for the absence of arbitrage is the existence of an equivalent martingale measures under which both prices and speeds are martingales in that measure, under a Lagranian system of coordinates. In order to close the model, we use the Ito-Wentzell formula to calculate the trajectories of speed and price in another system of coordinates, namely the Eulerian system.

The advantages of the no-arbitrage pricing approach are considerable. First, it has been widely accepted in finance as the easiest method to compute a fair price of all sorts of contracts (see Hull (2008)). Second, this method necessitates the smallest amount of economic assumptions, and is thus quasi model-free. The only parameters we need to calibrate our model are macroscopic parameters: the average amount of money a typical driver is willing to pay to save an hour of driving time, as well as the proportion of vehicles that use the invention. It is noted that these statistics are available, and thus allow us to calibrate the pricing model by the time it is implemented. This is important in order to simulate the behavior of our invention before implementation.

The only assumption that needs to be entered in our fair pricing method is some form of price volatility. This is consistent with models for pricing financial options, where the only parameter needed is the volatility of the underlying price process. It is noted that, once our invention is implemented, time series of the price of each lane at each position will be available, and thus historical volatility will be computable.

Our pricing method is model-based, and thus robust compared to the naive method consisting of interpolating pointwise price data of recorded transactions. The latter approach has an obvious disadvantage of not being operational before the system is rolled out, because of the lack of any information. A further disadvantage of interpolation when the system is illiquid is that one could imagine colluding vehicles creating fake transactions with the purpose of distorting the price to their advantage.

It is important to note that the present invention has the potential to considerably alter driving on motorways. Several studies have been made of the impact of this invention on traffic throughput and traffic stability, as measured in the number of bottlenecks. We refer the reader to FIGS. 3 and 4 for the impact on vehicle density, as well as potential prices elicited by the system. More details can be found in (Yuan). Other potential impacts of this invention, such as environmental impact, impact of a computer failure, safety and emissions are outside the scope of this invention. Their analysis is quite involved and deserves the attention of the regulator.

BRIEF DESCRIPTION OF THE DRAWINGS

FIG. 5 illustrates the parameter calibration in fair pricing method in the present invention.

FIG. 6 shows an initial density (per lane) conditions on a four-lane motorway in the present invention.

DETAILED DESCRIPTION OF THE INVENTION

The detailed description set forth below is intended as a description of the presently exemplary method provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the scope and spirit of the invention.

Unless defined otherwise, all technical and scientific terms used herein have the same meaning as commonly understood to one of ordinary skill in the art to which this invention belongs. We call autonomous vehicle any vehicle or group of vehicles (cars, trucks, and others) where the driver delegates the decision of changing lane on a motorway to a computer algorithm, whether the algorithm runs on a computer located inside the vehicle or whether some or all parts of the algorithm run on a computer located outside the vehicle. It is immaterial to the invention whether the computer that performs the algorithm belongs to the owner of the vehicle or to a third-party company, which may or may not charge the owner of the vehicle for the service provided. We use the term "an autonomous car decides" as a shorter way of saying "the computer associated with the autonomous car makes the decision to". It is immaterial to the invention whether the physical driver/passengers of the autonomous car have the possibility to override the decision of computer.

Figure 1:
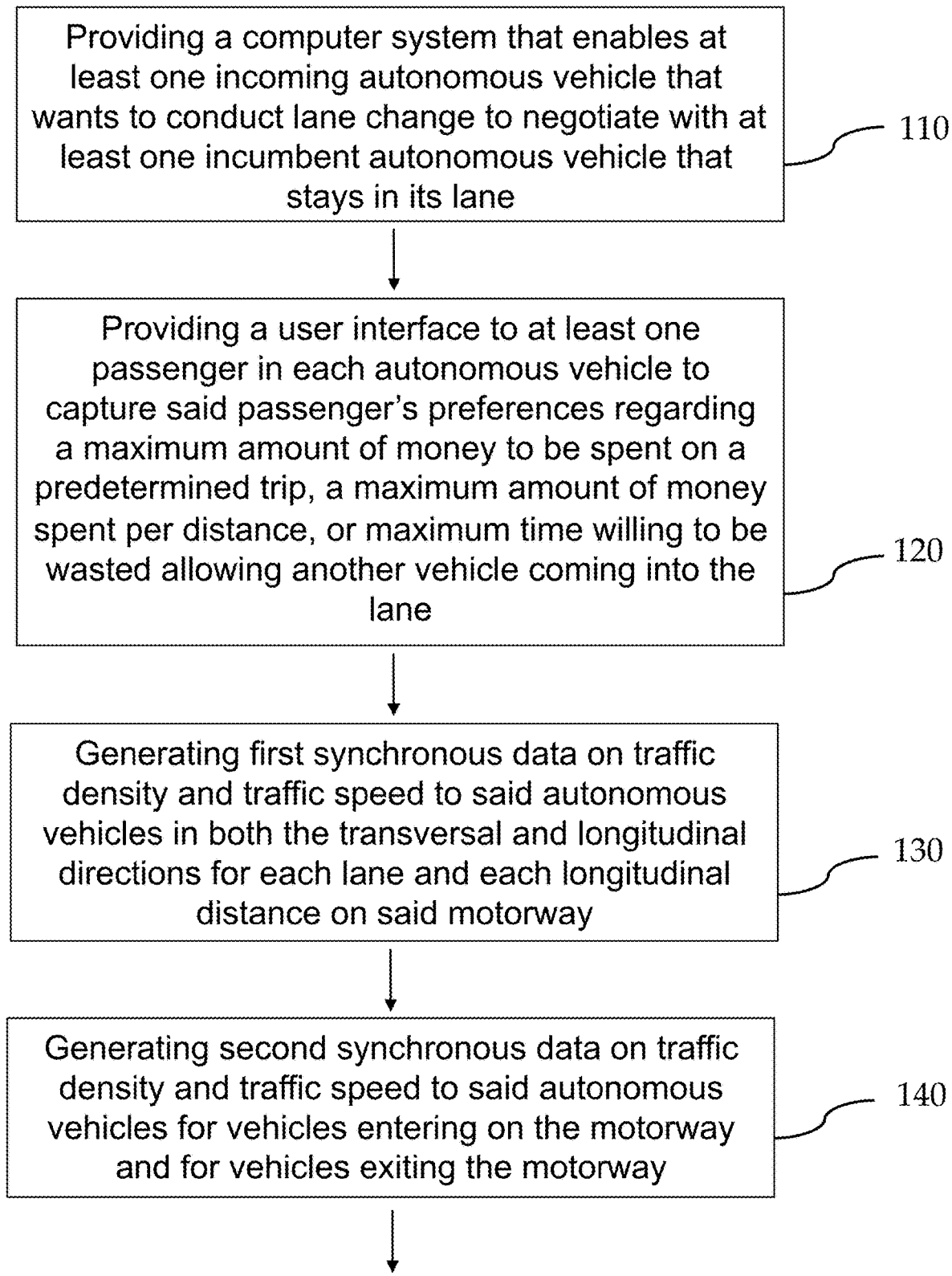
FIG. 1 is a flow diagram showing a method for autonomous vehicles to change lanes on a multiple-lane motorway in the present invention.
Figure 1:
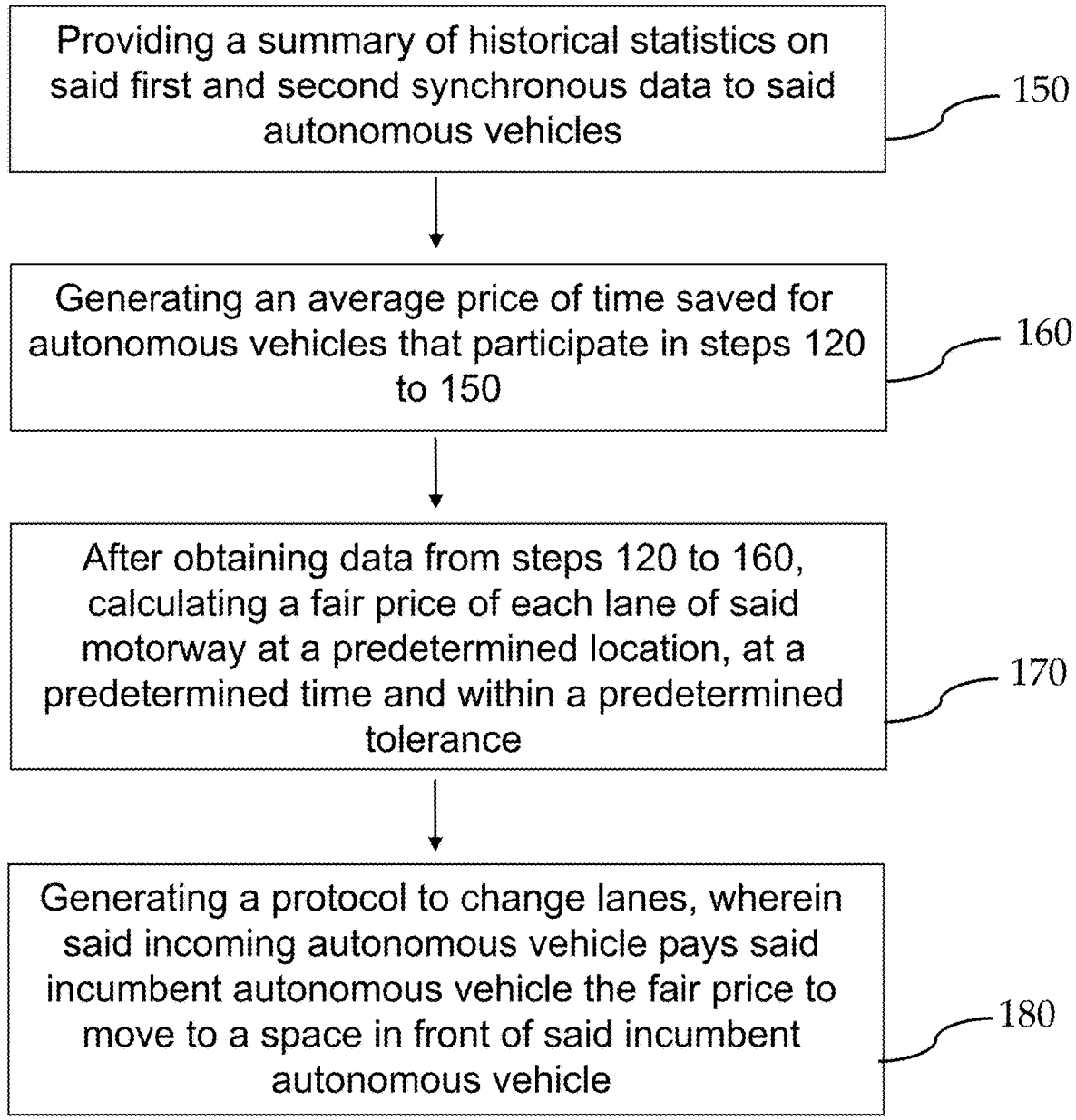

In one aspect, as shown in FIG. 1, a method for autonomous vehicles to change lanes on a multiple-lane motorway may include steps of: providing a computer system that enables at least one incoming autonomous vehicle that wants to conduct lane change to negotiate with at least one incumbent autonomous vehicle that stays in its lane 110; providing a user interface to at least one passenger in each autonomous vehicle to capture said passenger's preferences regarding a maximum amount of money to be spent on a predetermined trip, a maximum amount of money spent per distance, or maximum time willing to be wasted allowing another vehicle coming into the lane 120; generating first synchronous data on traffic density and traffic speed to said autonomous vehicles in both the transversal and longitudinal directions for each lane and each longitudinal distance on said motorway 130; generating second synchronous data on traffic density and traffic speed to said autonomous vehicles for vehicles entering on the motorway and for vehicles exiting the motorway 140; providing a summary of historical statistics on said first and second synchronous data to said autonomous vehicles 150; generating an average price of time saved for autonomous vehicles that participate in steps (120 to 150) 160; (g) after obtaining data from steps 120 to 160, calculating a fair price of each lane of said motorway at a predetermined location, at a predetermined time and within a predetermined tolerance 170; and generating a protocol to change lanes, wherein said incoming autonomous vehicle pays said incumbent autonomous vehicle the fair price to move to a space in front of said incumbent autonomous vehicle 180.

We use the term the incoming vehicle to denote any autonomous vehicle or group of autonomous vehicles that desires to move to an adjacent lane, and the term incumbent vehicle to denote any autonomous vehicle or group of autonomous vehicles that occupies the spot on said adjacent lane that the incoming vehicle desires to move to.

We call longitudinal distance the distance along the direction of traffic. The mathematical symbol x, measured in miles, designates the longitudinal distance. We denote by $\overline{X}$ the length of the motorway used for calibration.

We call transversal distance the distance perpendicular to the direction of traffic. The symbol y, measured in miles, designates the transversal distance. We denote by $\Delta y$ the width of a lane, and $\overline{Y}$ the width of the motorway.

Time is measured in hours and is denoted by t. The time t=0 corresponds to current time, i.e., the time at which we wish to estimate prices.

The traffic density, or more simply, density is designated by $\rho$. It measures the number of cars per unit of longitudinal and transversal distance. It is a function of the variables (x,y,t).

The traffic flow, or more simply the flow is designated by q. It is a vector-valued function of the variables (x,y,t). Indeed, we define:

the longitudinal flow $q^x$ which counts the number vehicles going in the longitudinal direction that cross a particular point (x,y) at time t per unit of time the transversal flow $q^y$ which counts the number vehicles going in the transversal direction that cross a particular point (x,y) at time t per unit of time.

The flow is thus a vector:

$$q = \begin{bmatrix} q^x \\ q^y \end{bmatrix}$$

The speed u is measured in Eulerian coordinates, and thus is a function of (x,y,t). It is composed of speed in the x direction, namely $u_x$ and speed in the y direction, namely $u_y$. We have:

$$u = \begin{bmatrix} u^x \\ u^y \end{bmatrix}$$

By definition:

$$q^x = \rho u^x$$

The lane price p is a function of (x,y,t). If an incoming car at location (x,y,t) desires to move to the lane at location y+Δy and this lane is not available, then it must pay the incoming price to the incumbent vehicle:

$$p(x, y+\Delta y, t) - p(x, y, t)$$

The noise in the system is denoted by N (x,y,t,ω), where ω refers to the random scenario. It affects the longitudinal speed $u^x$.

Protocol

While the present invention would be of easier use if it were embedded in vehicles equipped with level 4 or level 5 driving capacities, the protocol hereafter can be implemented by human drivers.

There are two different embodiments of the invention: whether the traffic authority serves as intermediary of the transaction or whether another company does. We consider the latter and for clarity, we take the case of a vehicle moving to the left, but the case of a vehicle moving to the right is symmetric.

Figure 2:
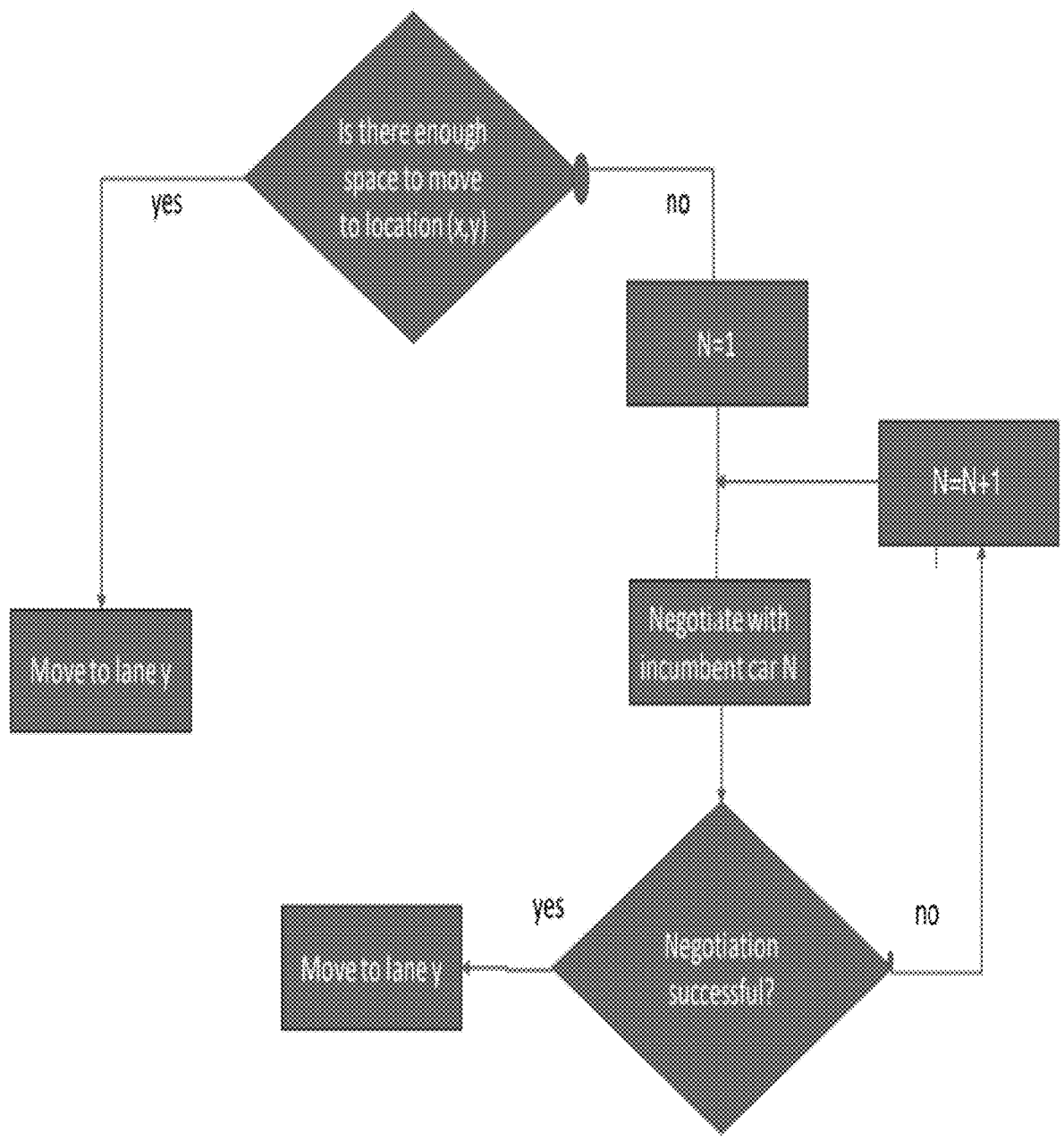
FIG. 2 is the protocol to change lanes in the present invention.

Let the position at time t of the incoming vehicle be (x,y−Δy). Suppose that said incoming vehicle wants to move to adjacent lane y. Incumbent vehicles on lane y are labelled by the letter N. The longitudinal distance of the car in front (N=1) should be less than equal to x. The next cars in the incumbent lane are labelled N=2, 3, . . . . If there is not enough space at location (x,y) said incoming car will negotiate a price with incumbent vehicle on the adjacent lane. The negotiation takes the following form. The incoming vehicle suggests a bid price, which is equal to the fair price p(x,y,t) plus a spread. The said spread depends on the passenger preferences. In a particular embodiment of the invention, the said spread is chosen by the passenger as a default parameter, which can be overridden by the said passenger at any time. In another embodiment, the said spread can be chosen by the computer system to avoid spending more than a maximum amount of money for the trip specified or for a particular distance. If the said first incumbent car (N=1) does not agree with the deal or is not equipped with a computer system to respond, then said incoming car waits and suggests the same transaction to incoming car N=2 until the negotiation is successful. The intermediary checks that the incoming car's cash balance is sufficient, checks that the incumbent car slows down significantly, collects a transaction fee from said incoming vehicle and clears the transaction to both parties. In this case, incumbent car N receives the price p(x,y,t)−p(x,y−Δy,t)>0 to slow down and the incoming car moves. This method is summarized in FIG. 2.

The negotiation is the critical part of the protocol. In the present invention, both the incoming and incumbent vehicles need to be able to calculate instantaneously the fair lane price p(x,y,t) as well as the fair lane price p(x,y,t). The fair price may or may not be binding, in the sense that each vehicle may decide whether to offer more or less than the fair price. We view this as a "system parameter." For instance, a spread could be added, like "pay no more than the fair price plus a spread." Or the transaction is rejected if the maximum amount of money to be spent on a particular trip is exceeded. Without a method to calculate a fair price, negotiations may never terminate.

In the second embodiment of the protocol, the traffic authority acts as intermediary. The only difference between the two embodiments is that the traffic authority may be granted more powers, such as blocking lane changes if it decides that the system leads to unstable traffic conditions. Another advantage of involving the central authority is that, on toll roads, it may pay the incumbent vehicle not in dollars but in "reduced toll." This would prevent astute drivers from gaming the system by making an unnecessary trip just to collect money by letting incoming vehicles pass them.

Fairpricing Model

It should be noted that all functions are continuous in the mathematical model, whereas they are discrete in the numerical method. It is noted that we provide an estimation method only for the new parameters that our method requires.

The method collects current and historical traffic conditions $\rho_0$ (x,y,t) for τ≤t≤0, 0≤x≤$\overline{X}$, 0≤y≤$\overline{Y}$. Traffic satisfies the conservation law for t≥τ

$$\frac{\partial \rho(x, y, t, \omega)}{\partial t} + \frac{\partial q^x(x, y, t, \omega)}{\partial x} + \frac{\partial q^y(x, y, t, \omega)}{\partial y} = 0$$

$$\rho(x, y, t, \omega) = \rho_0(x, y, \tau)$$

In our implementation we used a stochastic version of the LWR model $$u^x(x, y, t, \omega) = u_{max}\left(1 - \frac{\rho(x, y, t, \omega)}{\rho_{max}}\right) N(x, y, t, \omega)$$

The noise is given by:

$$N(x,y,t,\omega) = g(U(x,y,t,\omega))$$

The noise needs to be bounded above and positive. To that effect, we chose in our implementation $$g(x) = \begin{cases} \frac{1}{2}(1 + e^x) & x < 0 \\ \frac{1}{2}(3 - e^x) & x \geq 0 \end{cases}$$

The noise U(x,y,t,ω) is modeled as:

$$U(x,y,t,\omega) = \sigma(y) \int_0^t \int_0^{\overline{X}} f(t,t',x,x') \xi(x',y,t') dx' dt'$$

Where $\xi$ is singular white noise in 3 dimensions and the kernel $f$ is chosen to satisfy decreasing autocorrelation of U in the x direction and t direction. We chose the function:

$$f(t,t',x,x')=\exp(-a(t-t')^2-b(x-x')^2)$$

The model for the transversal flux is:

$$q^x(x, y, t, \omega) = h\left(u(x, y, t, \omega), \frac{\partial u(x, y, t, \omega)}{\partial y}, x, y, t\right) + K_1 \frac{\rho(x, y, t, \omega)}{\rho_{max}} \frac{\partial p(x, y, t, \omega)}{\partial y}$$

The model for the transversal flux $$q^x(x, y, t, \omega) = h\left(u(x, y, t, \omega), \frac{\partial u(x, y, t, \omega)}{\partial y}, x, y, t\right) + K_1 \frac{\rho(x, y, t, \omega)}{\rho_{max}} \frac{\partial p(x, y, t, \omega)}{\partial y}$$

The transversal flux is made of two terms: the "natural flow" h which equalizes density across lanes, and the "traded flow"

$$K_1 \frac{\rho}{\rho_{max}} \frac{\partial p}{\partial y}.$$

The natural flow represents the movement of cars outside our invention. We chose the simple model which tends to equalize traffic across lanes:

$$h = K_0 \frac{\partial u}{\partial y}$$

We chose $K_1$ to be a constant and $K_0$ can be estimated. We will describe its calibration in the numerical method section. Due to the presence of singular white noise, the model is singular but is well-defined as $u^x$ solves the following stochastic partial differential equation (SPDE): for $t \leq \tau$:

$$d_t u(x, y, t, \omega) = \mu^u(x, y, t, \omega) dt + \int_{[0,\overline{X}] \times [0,\overline{Y}]} \sigma^u(x, y, t, x', y', \omega) \xi(x', y', t') dx' dy' dt$$

$$u^x(x,y,\tau,\omega) = u_{max}\left(1 - \frac{\rho_0(x,y,\tau)}{\rho_{max}}\right)$$

Where the speed drift $\mu^u$ and $\sigma^u$ the speed volatility depend on all the parameters and functions previously defined. The price p is subject to the same speed uncertainty as the speed u and thus, we model it as the SPDE for $\tau \leq t \leq 0$:

$$d_t p(x, y, t, \omega) = \mu^p(x, y, t, \omega) dt + \int_{[0,\overline{X}] \times [0,\overline{Y}]} \sigma^p(x, y, t, x', y', \omega) \xi(x', y', t') dx' dy' dt$$

Where $\mu^p$ is the price drift and $\sigma^p$ is the price volatility. Accordingly, the price will be fair in the sense of no-arbitrage. When measured in Lagrangian coordinates, both the speed and price are martingales in the risk-neutral measure, where the risk-neutral measure is defined as the measure where the process:

$$\tilde{\xi} = \xi + \lambda$$

and to determine the market price of risk $\lambda$, we apply the Ito-Wentzell formula for $\tau \leq t \leq 0$:

$$\int_{[0,\overline{X}] \times [0,\overline{Y}]} \sigma^u(x, y, t, x', y', \omega) \lambda(x', y', t, \omega) dx' dy' dt = \tilde{\mu}^u(x, y, t, \omega)$$

Where:

$$\tilde{\mu}^u(x, y, t, \omega) = \mu^u(x, y, t, \omega) + \frac{\partial u^x(x, y, t, \omega)}{\partial x} u^x(x, y, t, \omega) + \frac{\partial u^y(x, y, t, \omega)}{\partial y} u^y(x, y, t, \omega)$$

One method to determine the market price of risk $\lambda$ is to discretize equation (6), which turns into one system (for each t and $\omega$) of linear equation.

The main goal of this method is to calculate the price $p(x,y,0,\omega)$, which is unknown. To this effect, we have two embodiments of the present invention. In case of low use of the invention, we postulate a form for the drift. In case of high use of the invention, we use statistics of the historical volatility to infer the implied volatility.

In the first embodiment, we assume that, for each (x,y) the price p(x,y) has been in steady state for some time. More precisely, we calibrate a stationary price value $\bar{p}(x,y)$ to market data (see numerical section for details) and choose the time $\tau \leq 0$ such that the family of process p(x,y,t) reaches steady state at time t=0. In other terms, for each $\tau \leq t \leq 0$ we solve the SPDE for price subject to initial condition p (x, t, $\tau$)=$\bar{p}(x,y)$. A general method is to set the price drift equal to, for some $\kappa > 0$:

$$\mu^p(x,y,t,\omega) = -\kappa(p(x,y,t,\omega) - \bar{p}(x,y))$$

for a parameter $\kappa$ to be determined in the numerical method section. Since prices should be proportional to speed (on average), the steady state value of the price $\bar{p}(x,y)$ is set to be proportional to the speed (averaged over time).

By the martingale property of price (expressed in Lagrangian coordinates) in the risk-neutral measure, we find that the price volatility $\sigma_p$ must satisfy, for $\tau \leq t \leq 0$:

$$\int_{[0,\overline{X}] \times [0,\overline{Y}]} \sigma^p(x, y, t, x', y', \omega) \lambda(x', y', t, \omega) dx' dy' = \tilde{\mu}^p(x, y, t, \omega)$$

where $\lambda(x', y', t, \omega)$ was calibrated previously, and:

$$\tilde{\mu}^p(x, y, t, \omega) = \mu^p(x, y, t, \omega) + \frac{\partial p(x, y, t, \omega)}{\partial x} u^x(x, y, t, \omega) + \frac{\partial p(x, y, t, \omega)}{\partial y} u^y(x, y, t, \omega)$$

It is noted that there are too many degrees of freedom to determine $\sigma_p$. To this effect, we restrict ourselves to a simpler family of volatilities, whereby volatility is not factor specific (i.e., does not depend on x', y'):

$$\sigma^P(x, y, t, \omega) = \frac{\hat{\mu}^P(x, y, t, \omega)}{\lambda(x, y, t, \omega)}$$

In the second embodiment of the pricing method, we assume that estimators $\hat{\sigma}^P(x,y,t,\omega)$ of $\sigma^P(x,y,t,\omega)$ are given based on observed data $p(x,y,t,\omega)$ for $\tau \leq t \leq 0$. We then set $$\hat{\mu}^P(x, y, t, \omega) = \sigma^P(x, y, t, \omega)\lambda(x, y, t, \omega)$$

$$\mu^P(x, y, t, \omega) =$$

$$\hat{\mu}^P(x, y, t, \omega) - \frac{\partial p(x, y, t, \omega)}{\partial x} u^x(x, y, t, \omega) + \frac{\partial p(x, y, t, \omega)}{\partial y} u^y(x, y, t, \omega)$$

Numerical Method

Let $\Delta x$, $\Delta y$ and $\Delta t$ be, respectively, the space step in the x direction, the space step (i.e., the width of a lane) in the y direction and the time step. The following table shows the correspondence between the discrete variables in this section and the continuous variables in the previous section:

| Name | Continuous variable | Discrete var. |
|---|---|---|
| Density | $\rho$ (j$\Delta$x, l$\Delta$y, i$\Delta$t) | $\rho_l^{i,j}$ |
| Longitudinal speed | $u^x$ (j$\Delta$x, l$\Delta$y, i$\Delta$t) | $u_l^{i,j}$ |
| Longitudinal flow | $q^x$ (j$\Delta$x, l$\Delta$y, i$\Delta$t) | $q_{x,l}^{i,j}$ |
| Transversal flow | $q^y$ (j$\Delta$x, l$\Delta$y, i$\Delta$t) | $q_{y,l}^{i,j}$ |
| Longitudinal speed drift | $\mu^u$ (j$\Delta$x, l$\Delta$y, i$\Delta$t) | $\mu_{u,l}^{i,j}$ |
| Longitudinal speed factor | f (j$\Delta$x, j'$\Delta$x, i$\Delta$t, i'$\Delta$t) | $f_{i,l}^{i',j}$ |
| Derivative of speed factor | $\frac{\partial}{\partial t}f$(j$\Delta$x, j'$\Delta$x, i$\Delta$t, i'$\Delta$t) | $\frac{\partial f_{i,l}^{i',j}}{\partial t}$ |
| Longitudinal speed volatility | $\sigma_u$(j$\Delta$x, l$\Delta$y, j'$\Delta$x, i$\Delta$t) | $\sigma_{y,l}^{i,j,j'}$ |
| Lane price | p(j$\Delta$x, l$\Delta$y, i$\Delta$t) | $p_l^{i,j}$ |
| Lane price drift | $\mu^p$ (j$\Delta$x, l$\Delta$y, i$\Delta$t) | $p_{p,l}^{i,j}$ |
| Lane price volatility | $\sigma^p$(j $\Delta$x, l$\Delta$y, i$\Delta$t) | $\sigma_{p,l}^{i,j}$ |
| Minimum time | $\tau = -I_{min}\Delta t$ | $I_{min}$ |
| Maximum time | $T = I_{max}\Delta t$ | $I_{max}$ |
| Motorway length | X = J$\Delta$x | J |
| Motorway width | Y = L$\Delta$y | L |

Note that lane l = 0 is the right lane, where traffic enters and exits, so that $q_{y,0}^{i,j}$ is an exogenous variable, namely, random traffic flowing into or out of the motorway due to entrance ramps or exit ramps.

For the first embodiment of the pricing method, where no statistics on the price is available, the first step is to calibrate the constants $K_1$ and $\kappa$. The parameter $K_1$ represents the elasticity of the traded flow with respect to the difference in lane prices, weighted by traffic density. The parameter $\kappa$ represents the speed of mean reversion of fair prices to the mean fair price, the latter being proportional to average lane prices. This calibration step is achieved offline, i.e., can be performed only once. The second step is to estimate the price online.

There are three important times in the simulation. We begin the simulation at time $\tau = -I_{min}\Delta t < 0$. By time $t = 0$, the system should have reached steady state. We then collect system statistics in steady state between time $t=0$ and $t=T$, that is, in steady state. We use N scenarios for the simulation, and we vary the parameters K1 and $\kappa$ until the following conditions are met:

the empirical variance of an average of all prices at time $t=0$ and $t=T$ are sufficiently close, and
the maximum TimeSaved can hardly be improved upon.

Indeed, one of the goals of the invention is to maximize the travel time saved for the incoming vehicles. The variable TimeSaved will be the sum of all travel times saved by all trading incoming cars during the simulation time, averaged across all scenarios. The variable MoneyPaid will be the sum of all prices paid by incoming cars, averaged across scenarios.

In FIG. 5, we define a flow function, which is defined below:

$$F(\rho, N) = \rho u_{max}\left(1 - \frac{\rho}{\rho_{max}}\right)N$$

where naturally, the traffic flow is bounded by $$\overline{F} = \frac{\rho_{max} u_{max}}{4}$$

We also define $Z_l^{i,j}$ to be a collection of independent standard normal variables.

For each value of the parameters K1, $\kappa$ and scenario the variables TimeSaved and MoneyPaid will be calculated according to the method showed in FIG. 5. We note that, for space constraints, some details of the method as omitted, such as obvious boundary cases (left or right of the freeway). Also, the method to calculate the time saved and money paid is not displayed, but should be straightforward for persons of the art.

Note that we did not include the last term in the equation for $\mu^u$ in the method outlined in FIG. 5 because the numerical value is small enough to omit.

We average TimeSaved and MoneyPaid across scenarios. We pick the values of K1 and $\kappa$ according to the criterion above, i.e., optimize TimeSaved and maximize stationarity. It is known that US drivers are ready to pay an Average-Money of $15 per hour of travel saved. We then calculate a variable c accordingly.

$$c = Timesaved * \frac{AverageMoney}{Moneypaid}$$

We update $\overline{p}_l^j$ according to the rule:

$$\overline{p}_l^j = c * \rho_l^{-I_{min},j}$$

Thus we are sure that in our system, on average, incoming vehicles will pay $15 per hour of travel saved.

In a second embodiment of our invention (refer to instruction 250 in FIG. 5), once prices become more liquid, and price correlation data becomes available the lane price volatility $\sigma_{p,l}^{i,j}$ will be decomposed into factors.

Figure 3:
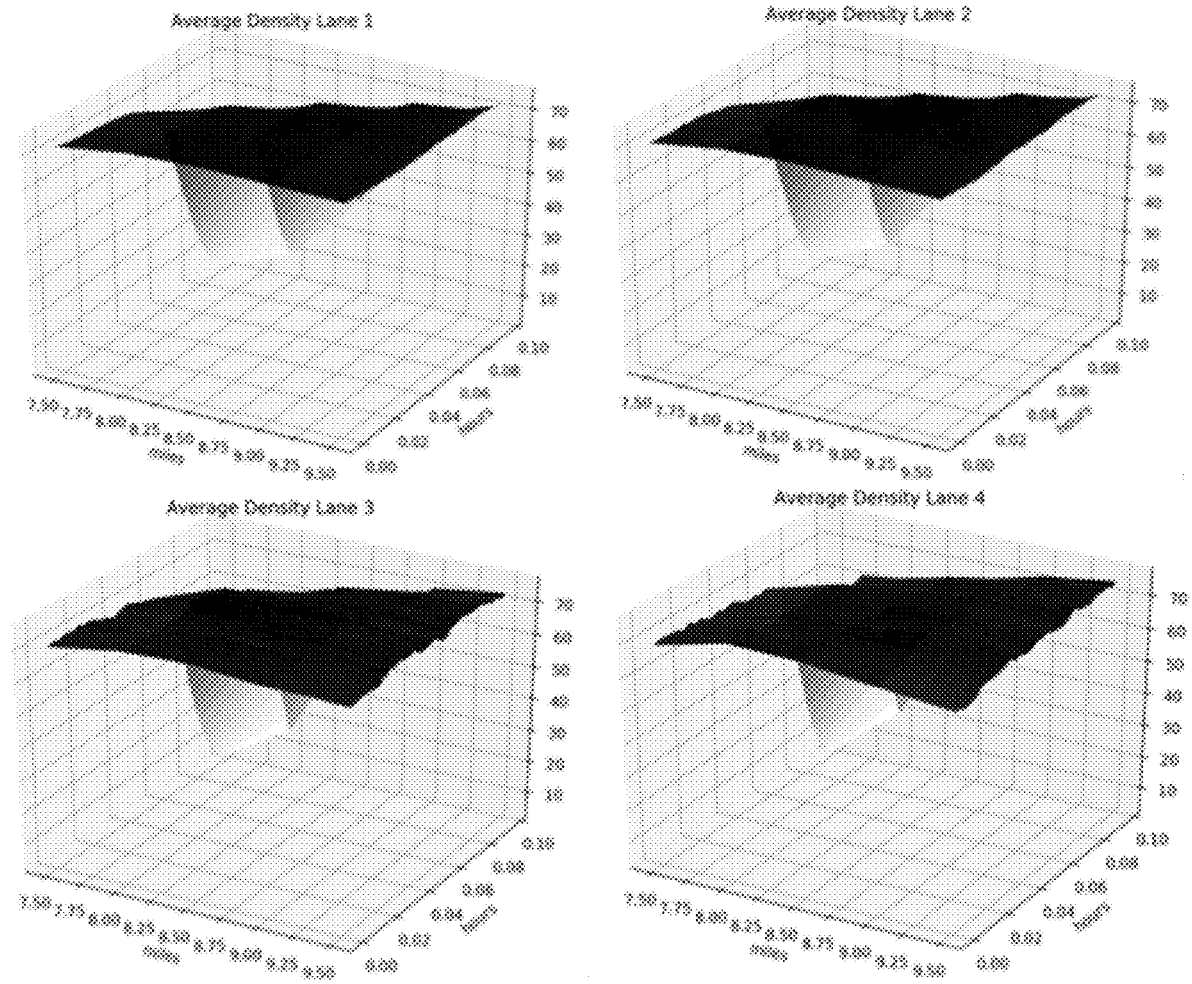
FIG. 3 shows motorway density for four lanes as a function of time and distance (average across 10 scenarios) after parameter calibration of fair pricing method in the present invention.
Figure 4:
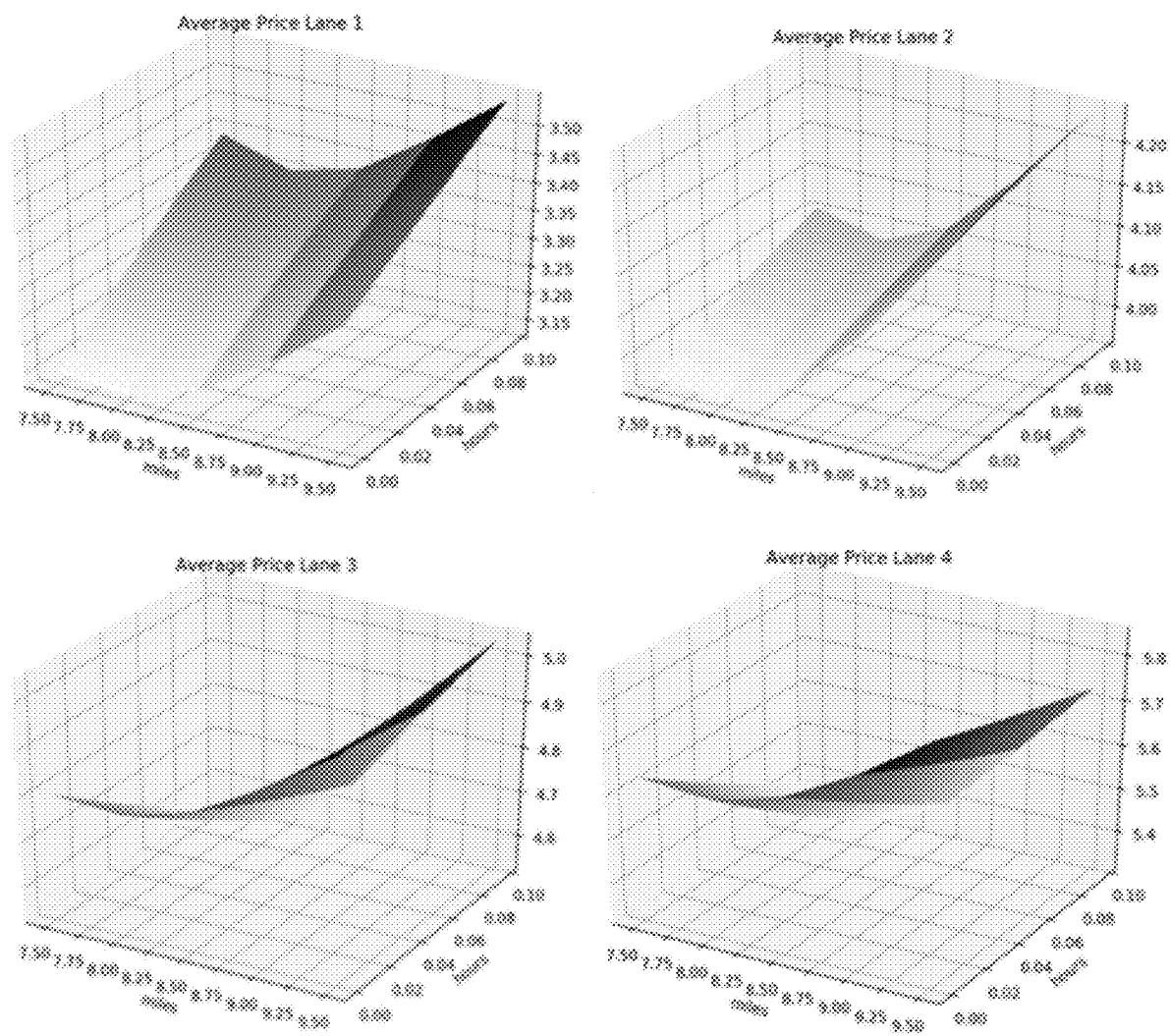
FIG. 4 illustrates motorway price for four lanes as a function of time and distance (average across 10 scenarios) after parameter calibration of fair pricing method in the present invention.

The average (across 10 scenarios) of lane price p and lane density p is displayed in FIGS. 3 and 4 in a motorway with 4 lanes.

The parameters of the numerical method are dx=0.5, dt=0.002, dy=0.003. We chose $\tau=-0.1$ hours and T=0.1 hours. The length of the road is X=10 miles. The initial density per lane is showed in FIG. 6. The traffic model uses $\rho_{max}=180$ cars per longitudinal mile per lane, and $u_{max}=75$ miles per hour. We chose a=0.5, b=1 (and note that the choice of these parameters does not influence the results much), and $K_0=0.5$. The following volatilities are used:

$$\sigma_u = \begin{bmatrix} 0.05 \\ 0.06 \\ 0.07 \\ 0.08 \end{bmatrix}$$

We calculated a maximum travel time gained of 2.2% using our invention, corresponding to $K_1=0.2$, and $=2$. Note that this figure is averaged across all vehicles on the freeway. If we consider that at most half the vehicles spend money to buy speed (and thus at most half the vehicles are "incoming" cars in our model), this corresponds to a time gain of 4.4% for speed buyers.

Once parameters are determined, the method can be run online, with continuous feed of traffic density information, arriving at time $\Delta t, 2\Delta t, 3\Delta t, \ldots$. The optimal parameter $K_1$, chosen as to maximize Timesaved, is multiplied by the proportion of the vehicles using the invention.

Rather than simulating random variables $Z_l^{i,j}$ at each time step, one embodiment of the present invention may include backing out estimators $\hat{Z}_l^{i,j}$ from synchronous traffic density data, which make the equations of our model consistent. These variates $\hat{Z}_l^{i,j}$ are then fed into the pricing model to produce accurate estimates $\hat{p}_l^{i,j}$ of the price of lane l at time $i\Delta t$ and longitudinal distance $j\Delta x$.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A method for autonomous vehicles to change lanes on a multiple-lane motorway comprising steps of:
    (a) providing a computer system that enables at least one incoming autonomous vehicle that wants to conduct lane change to negotiate with at least one incumbent autonomous vehicle that stays in its lane;
    (b) providing a user interface to at least one passenger in each autonomous vehicle to capture said passenger's preferences regarding a maximum amount of money to be spent on a predetermined trip, a maximum amount of money spent per distance, or maximum time willing to be wasted allowing another vehicle coming into the lane;
    (c) generating first synchronous data on traffic density and traffic speed to said autonomous vehicles in both the transversal and longitudinal directions for each lane and each longitudinal distance on said motorway;
    (d) generating second synchronous data on traffic density and traffic speed to said autonomous vehicles for vehicles entering on the motorway and for vehicles exiting the motorway;
    (e) providing a summary of historical statistics on said first and second synchronous data to said autonomous vehicles;
    (f) generating an average price of time saved for autonomous vehicles that participate in steps (b) to (e);
    (g) after obtaining data from steps (b) to (f), calculating a fair price of each lane of said motorway at a predetermined location, at a predetermined time and within a predetermined tolerance; and
    (h) generating a protocol to change lanes, wherein said incoming autonomous vehicle pays said incumbent autonomous vehicle the fair price to move to a space in front of said incumbent autonomous vehicle,
    wherein the step 1(g) of calculating the fair price further includes steps of:
        (a) initializing said traffic density across lanes and across a motorway length;
        (b) initializing said fair price across lanes and across the motorway length;
    (c) calculating a normal flow and a traded flow, said traded flow being proportional to the density times the difference in lane prices; the transversal flow being given by $$q_{y,l}^{i,j} = \left(-K_0(\rho_l^{i,j} - \rho_{l-1}^{i,j}) + K_1 \frac{\sqrt{\rho_{l+1}^{i,j}\rho_l^{i,j}}}{\rho_{max}}(p_{l+1}^{i,j} - p_l^{i,j})\right) \Big/ \Delta y;$$

(d) calculating a drift of a speed in a Lagrangian referential in a traffic flow model that incorporates randomness in time, longitudinal distance and transversal distance, the randomness being due to accidents or incoming/outgoing flows from motorway entrances/exits; the speed is given by $$u_l^{i+1,j} = u_{max}\left(1 - \frac{\rho_l^{i+1,j}}{\rho_{max}}\right)g(U_l^{i,j}),$$

and the drift of the speed in a Lagrangian referential is given by $$\mu_{u,l}^{i,j} = \frac{u_{max}}{\rho_{max}g(U_l^{i,j})}(g^2(U_l^{i,j})\left(\frac{q_{x,l}^{i,j} - q_{x,l}^{i,j-1}}{\Delta x} + \frac{q_{y,l}^{i,j} - q_{y,l-1}^{i,j}}{\Delta y}\right) + \frac{\rho_{max}}{u_{max}}u_l^{i,j}A;$$

(e) calculating an error $\hat{Z}_l^{i,j}$ between the traffic flow model and the actual density data at each point in time;
    (f) incorporating said error $\hat{Z}_l^{i,j}$;
    (g) calculating said drift of the speed in an Eulerian referential; the drift of the speed in Eulerian referential is given by $$\tilde{\mu}_{u,l}^{i,j} = \mu_{u,l}^{i,j} + \frac{1}{\Delta x}(u_l^{i,j} - u_l^{i-1,j})u_l^{i,j};$$

(h) calculating a market price of risk in the Eulerian referential, in order to implement a no-arbitrage condition; a vector of the drift is given by $\vec{\mu}_{u,l}^i = [\tilde{\mu}_{u,l}^{-i,0} \ldots \tilde{\mu}_{u,l}^{i,J}]$, the matrix of volatility is given by $$B_{u,i,l} = \begin{bmatrix} b_{u,l}^{i,0,0} & \cdots & b_{u,l}^{i,0,J} \\ \vdots & \ddots & \vdots \\ b_{u,l}^{i,J,0} & \cdots & b_{u,l}^{i,J,J} \end{bmatrix},$$

where $b_{u,l}^{i,j,j'} = g'(U_l^{i,j})u_l^{i,j}f_{i,i'}^{j,j'}/g(U_l^{i,j})$, and the market price of risk is given by $$\vec{\lambda}_{u,l}^i = \frac{B_{u,i,l}^{-1}\vec{\mu}_{u,l}^i}{\sigma_y(l)}; \lambda_{u,l}^{i,j} = \text{sgn}(\lambda_{u,l}^{i,j})\max(|\lambda_{u,l}^{i,j}|, \varepsilon);$$

(i) calculating a drift of a price in the Eulerian referential; the drift of the price in a Eulerian referential is given by $\mu_{p,l}^{i,j} = -\kappa(p_l^{i,j} - p_l^{-j})$;
    (j) calculating said drift of the price in a Lagrangian referential; the drift of the price in a Lagrangian referential is given by $$\tilde{\mu}_{p,l}^{i,j} = \mu_{p,l}^{i,j} + \frac{p_l^{i,j} - p_l^{j}}{\Delta x} u_l^{i,j};$$

(k) calculating a volatility of a price; the volatility of the price is given by $$\sigma_{p,l}^{i,j} = \frac{\tilde{\mu}_{p,l}^{i,j}}{\lambda_{u,l}^{i,j}};$$

and (l) simulating said prices calculated in steps (h) to (k) in the Eulerian referential; the prices in a Eulerian referential is given by $p_l^{i+1,j} = p_l^{i,j} + \mu_{p,l}^{i,j} \Delta t + \sigma_{p,l}^{i,j} Z_l^{i,j} \sqrt{\Delta t}$.

2. The method for autonomous vehicles to change lanes on a multiple-lane motorway of claim 1, further comprising a step of providing a historical price for lane change.

3. The method for autonomous vehicles to change lanes on a multiple-lane motorway of claim 1, wherein the step 1(h) further includes steps of:
  (a) determining which adjacent lane, if any, said incoming autonomous vehicle wants to move into;
  (b) determining whether said incoming autonomous vehicle should pay the fair price to move into said adjacent lane;
  (c) determining a bid price for said incoming autonomous vehicle to move into said adjacent lane, based on the fair price;
  (d) said incoming autonomous vehicle communicating said bid price with said incumbent autonomous vehicle;
  (e) said incumbent autonomous vehicle comparing the bid price based with the fair price;
  (f) said incumbent autonomous vehicle allowing the incoming said autonomous vehicle for lane change after comparing said bid price with said fair price; and
  (g) repeating steps 3(c) to 3(f) until said incoming autonomous vehicle being allowed to enter one of said adjacent lanes.

4. A method for calibrating parameters of in a traffic and pricing model comprising steps of:
  (h) initializing a traffic density across lanes and across a motorway length;
  (i) initializing a price across the lanes and across the motorway length;
  (j) calculating a normal flow and a traded flow, the traded flow being proportional to the density times the difference in lane prices; the transversal flow being given by $$q_{y,l}^{i,j} = \left( -K_0(\rho_l^{i,j} - \rho_{l-1}^{i,j}) + K_1 \frac{\sqrt{\rho_{l+1}^{i,j} \rho_l^{i,j}}}{\rho_{max}} (p_{l+1}^{i,j} - p_l^{i,j}) \right) / \Delta y;$$

(k) calculating a drift of a speed in a Lagrangian referential in a traffic flow model that incorporates randomness in time, longitudinal distance and transversal distance, the randomness being due to accidents or incoming/outgoing flows from motorway entrances/exits; the speed is given by $$u_l^{i+1,j} = u_{max} \left( 1 - \frac{\rho_l^{i+1,j}}{\rho_{max}} \right) g(U_l^{i,j}),$$

and the drift of the speed in a Lagrangian referential is given by $$\mu_{u,l}^{i,j} = \frac{u_{max}}{\rho_{max} g(U_l^{i,j})} (g^2(U_l^{i,j}) \left( \frac{q_{x,l}^{i,j} - q_{x,l}^{i,j-1}}{\Delta x} + \frac{q_{y,l}^{i,j} - q_{y,l}^{i,j-1}}{\Delta y} \right) + \frac{\rho_{max}}{u_{max}} u_l^{i,j} A;$$

(l) calculating said drift of the speed in an Eulerian referential; the drift of the speed in Eulerian referential is given by $\tilde{\mu}_{u,l}^{i,j} = \mu_{u,l}^{i,j} + 1/\Delta x (u_l^{i,j} - u_l^{j-1,1}) u_l^{i,j}$;
  (m) calculating a market price of risk in the Eulerian referential, in order to implement a no-arbitrage condition; a vector of the drift is given by $\vec{\mu}_{u,l}^{i} = [\mu_{u,l}^{i,0} \ldots, \mu_{u,l}^{i,J}]$, the matrix of volatility is given by $$B_{u,i,l} = \begin{bmatrix} b_{u,l}^{i,0,0} & \cdots & b_{u,l}^{i,0,J} \\ \vdots & \ddots & \vdots \\ b_{u,l}^{i,J,0} & \cdots & b_{u,l}^{i,J,J} \end{bmatrix},$$

where $b_l^{i,j,j'} = g'(U_l^{i,j}) u_l^{i,j} f_{i,l}^{j,j'} / g(U_l^{i,j})$, and the market price of risk is given by $$\vec{\lambda}_{u,l}^{i} = \frac{B_{u,i,l}^{-1} \vec{\mu}_{u,l}^{i}}{\sigma_y(l)}; \lambda_{u,l}^{i,j} = \text{sgn}(\lambda_{u,l}^{i,j}) \max(|\lambda_{u,l}^{i,j}|, \varepsilon);$$

(n) calculating a drift of a price in the Eulerian referential; the drift of the price in a Eulerian referential is given by $\mu_{p,l}^{i,j} = -\kappa(p_l^{i,j} - \bar{p}_l^{j})$;
  (o) calculating said drift of the price in a Lagrangian referential; the drift of the price in a Lagrangian referential is given by $$\tilde{\mu}_{p,l}^{i,j} = \mu_{p,l}^{i,j} + \frac{p_l^{i,j} - p_l^{j}}{\Delta x} u_l^{i,j};$$

(p) calculating a volatility of a price; the volatility of the price is given by $$\sigma_{p,l}^{i,j} = \frac{\tilde{\mu}_{p,l}^{i,j}}{\lambda_{u,l}^{i,j}};$$

(q) simulating said prices calculated in steps (f) to (i) in the Eulerian referential; the prices in a Eulerian referential is given by $p_l^{i+1,j} = p_l^{i,j} + \mu_{p,l}^{i,j} \Delta t + \sigma_{p,l}^{i,j} Z_l^{i,j} \sqrt{\Delta t}$,
  (r) repeating steps (c) to (j) across a plurality of scenarios;
  (s) repeating steps (c) to (k) across various parameters $\kappa$ (speed of mean-reversion) and K1 (price elasticity of traded flow); and
  (t) choosing best parameters using criteria of maximizing time saved.

* * * * *